United States Patent [19]

Ward et al.

[11] Patent Number: 4,499,872

[45] Date of Patent: Feb. 19, 1985

[54] ULTRA LEAN BURN CARBURETTED ADIABATIC ENGINE

[75] Inventors: Michael A. V. Ward, Lexington, Mass.; Robert P. Lefevre, Dover, N.H.

[73] Assignee: Combustion Electromagnetics, Inc., Arlington, Mass.

[21] Appl. No.: 456,612

[22] Filed: Jan. 10, 1983

[51] Int. Cl.³ .......................... F02D 13/02; F02P 15/02
[52] U.S. Cl. .................................. 123/344; 123/90.18; 123/536; 123/638
[58] Field of Search ............... 123/344, 347, 536, 543, 123/549, 638, 90.18; 261/DIG. 78

[56] References Cited

U.S. PATENT DOCUMENTS

| | | | |
|---|---|---|---|
| 3,776,212 | 12/1973 | Karlowitz | 123/260 X |
| 3,934,566 | 1/1976 | Ward | 123/536 X |
| 4,064,852 | 12/1977 | Fulenwider, Jr. | 123/549 X |
| 4,258,672 | 3/1981 | Hietikko | 123/90.18 |
| 4,284,054 | 8/1981 | Kumagai et al. | 123/536 |
| 4,287,862 | 9/1981 | Noguchi et al. | 123/536 |
| 4,296,720 | 10/1981 | Nakanishi et al. | 123/638 |
| 4,297,983 | 11/1981 | Ward | 123/193 P |
| 4,308,519 | 12/1981 | Garcea et al. | 123/198 A |
| 4,317,068 | 2/1982 | Ward et al. | 123/169 MG |

FOREIGN PATENT DOCUMENTS

109723 8/1980 Japan ...................................... 123/536

*Primary Examiner*—William A. Cuchlinski, Jr.
*Attorney, Agent, or Firm*—Jerry Cohen; M. Lawrence Oliverio

[57] ABSTRACT

An improved carburetted internal combustion engine (10) which operates with an extremely lean mixture, without a conventional cooling system, and at an elevated temperature characteristic of an adiabatic engine. The engine uses two ignition sources (20, 21) symmetrically disposed about the center of the cylinder head, and/or a third igniting and microwave coupling means (19) at the center, to achieve extreme lean mixture combustion and relatively fast burn necessary for adiabatic engine operation. The engine incorporates other features to improve its efficiency and emissions, including engine air-throttling through controlled intake valve closure and unconventional valve timing.

31 Claims, 7 Drawing Figures

ULTRA LEAN BURN CARBURETTED ADIABATIC ENGINE

BACKGROUND OF THE INVENTION AND PRIOR ART

The present invention relates to internal combustion engines and in particular to a new high efficiency, low emissions engine.

The automotive industry's answer to improved engine efficiency and low emissions (necessary to meet emission standards) is the computer controlled/catalytic converter rich burning, water cooled gasoline engine, and the diesel engine. The former is very expensive, complex and fuel inefficient, and the latter is also very expensive, complex, heavy and has serious emission problems (soot and NOx). There is a great need for an engine that is highly fuel efficient, cheap, simple and clean. Variations of these two engine types, such as stratified charge engines and fast lean burn engines, are improved systems but still have the shortcomings of requiring high swirl to operate (which reduces efficiency through increased heat transference), computer controlled three-way catalytic converter operation, and conventional cooling systems. Most notable of these are the Honda CVCC engine, the May Fireball, and the Nissan Naps-Z engine.

There is much prior art on improving ignition of very lean mixtures. For the present purposes, Ward and Wu, Plasma Jet Ignition, U.S. Pat. No. 4,317,068 discloses an improved ignition system for igniting lean mixtures. Ward, U.S. Pat. No. 4,297,983 discloses a system for application to the engine design disclosed here, which is capable of actually stimulating the burn so that the lean limit of flammability is extended and the flame speed is increased by electrical (microwave) means.

Prior art on operating an engine adiabatically exists, such as Automotive Engineering, June 1978, "Insulated Pistons Raises Diesel Efficiency"; SAE Paper 810070, 1981, "Cummins-Taradcom Adiabatic Turbocompound Engine Program"; Popular Science, December, 1982, "From Japan's Labs-Ceramic Diesels". However, all this prior art is on the adiabatic deisel. It is generally conceded that adiabatic operation is not possible for the premixed, homogeneous charge spark ignited (gasoline) engine. The reason given is that at the higher operating temperatures associated with adiabatic operation serious knock (detonation) problems would ensue so that the engine simply would not run.

OBJECTS OF THE INVENTION

It is a principal object of this invention to simplify the design and operation of the spark (electrically) ignited internal combustion (IC) engine and to have it operate essentially adiabatically, with low emissions and high efficiency, through the rapid combustion of extremely lean mixtures; that is, to operate the engine lean enough to meet NOx standards, and to eliminate the need for the conventional cooling system (to at most require minimal air-cooling). In conjunction with the lean operation to: (1) reduce the burn time for further efficiency increases and, (2) more important, to eliminate the possibility of serious detonation (knock) which would otherwise ensue (and allow for the possibility of using a simple lean burn carburetter, or other simple non-incylinder injection means of introducing the fuel). Other objectives of the invention are to provide fast warm-up and elevated operating temperatures (without necessarily requiring the use of ceramics because of the lower average temperatures resulting from the extreme lean mixture operation). Other objectives are to use higher compression and expansion ratios to further increase engine efficiency and to raise precombustion and lower postcombustion temperatures.

Further objectives are to use this simplified engine design to greater advantage by incorporating a novel engine air-throttling technique so as to substantially reduce air pumping losses; and to use unconventional valve timing for high efficiency and low emissions. Other objects and advantages will be pointed out hereinafter, and will become apparent from the following discussion and description of particular preferred embodiments of the invention when read in conjunction with the accompanying drawings.

SUMMARY OF THE INVENTION

This invention comprises an extremely lean burning spark (electrically) ignited internal combustion engine, using preferably a carburetter and double overhead cams with a semi(part)-spherical cylinder head (or conical shaped head), and operating at an elevated engine temperature without a conventional (forced) cooling system (operating approximately adiabatically). The engine features two or three igniting sources for reducing the burn path, and electromagnetic and thermal means for both speeding up the flame and allowing extremely lean mixtures to burn as well as a wide range of lean mixtures (essential to the adiabatic operation, emissions reduction and efficiency gain). The engine also has a high expansion ratio and preferably an oil-less (dry) crankcase (to enhance high temperature operation). The engine incorporates special piston and cylinder designs for improved operation, and features a novel mechanism for controlling intake valve closure (CIVC) to throttle the engine with substantially lower air pumping losses (reducing or eliminating the need for the carburetter throttle plate). Stainless steel (SS) or equivalent combustion chamber surfaces are preferably used to handle the higher temperatures as SS is easy to work with and is strong, with ceramics used where lack of brittleness is not critical. Stainless steel also has a low thermal conductivity (for a metal) and a high electrical resistivity, making for both faster warm up and effective microwave coupling to the combustion chamber and heating of the chamber surfaces.

In the normal cruising condition (low to moderate load), the engine preferably uses an extremely lean mixture combustible over a wide mixture strength, and delayed exhaust valve closure and opening (say 30° after top dead center (TDC) and after bottom dead center (BDC) respectively) to heat up the intake charge and to both extract maximum expansion work and promote oxidation of burnt gases. Intake of mass of air/fuel mixture is preferably controlled through intake valve closure (CIVC). The intake charge is further heated by heat transference to it from hot cylinder walls and by further compressing it with a higher compression ratio. Ignition is achieved by preferably more than one high current electrical sources, and the flame is stimulated (accelerated) through above mentioned preheating and by electromagnetic coupling to the flame. Flame spreading and microwave coupling are improved by radial squish produced by the lobed rim of the piston closely approaching cylinder head near top dead center. Air-fuel ratio determination, CIVC operation, exhaust valve and ignition timing and flame stimulation, are preferably controlled by means of an electronic controller through feedback techniques, to more accurately vary the above parameters for meeting emission standards at optimal engine efficiency.

BRIEF DESCRIPTION OF THE DRAWINGS

The nature and objects of the invention are illustrated and described in reference to the following drawings, which also illustrate the preferred embodiments of the invention.

DESCRIPTION OF THE PREFERRED EMBODIMENTS

Figure 1:
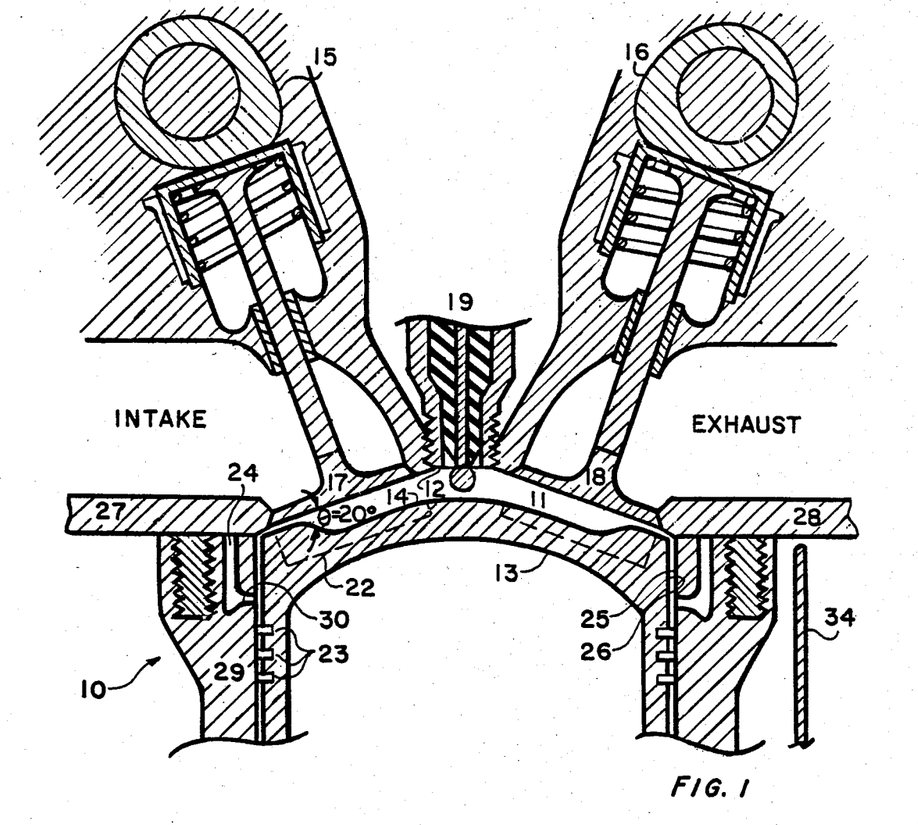
FIG. 1 depicts the end (lateral) view of one cylinder of the preferred embodiment of the improved engine invention, depicting most of the operational features of the improved engine, including cams and valves, cylinder head and upper cylinder sleeve, and upper part of the piston.

FIG. 1 depicts the preferred embodiment of the engine apparatus 10 of the invention, composed of a semi-spherical (conical) combustion chamber 11 with an included angle $\theta$ of 18° to 24° with respect to the horizontal ($\theta = 20°$ here), said chamber being defined by the cylinder head 12, the piston face 14 (of piston 13) and the upper surface 25 of the cylinder sleeve 29. The design includes double overhead cams 15 and 16 to provide independent control of the valves 17 and 18 (to achieve controlled intake valve closure of intake valve 17). This semi-spherical design is chosen because it provides room for the centrally located microwave probe coupler 19, since the cam/valve mechanisms locate outwards and away from each other. It also provides naturally improved breathing because of the better air-flow pattern and relatively larger area it provides for valves, compensating in part for the smaller valves necessitated by the presence of the coupler 19. It also allows for the placement of the two spark plugs 20 and 21 (FIG. 1A) without having them interfere with coupler 19 or the spark plugs of the adjacent cylinder. The included angle $\theta$ is picked to satisfy the above mentioned spatial constraints and to minimize the surface to volume ratio. The combustion chamber does not have to be circularly symmetric (the piston valve cut-outs already destroy the perfect symmetry).

The piston surface shape 14 is of the "Mexican Hat" variety, with the side rim or lobe 22 introduced to help stabilize the resonant frequency of the lowest order microwave mode contemplated here (See Ward, U.S. Pat. No. 4,297,983), and to produce radial squish near top dead center (TDC). The squish serves to spread the flame and thus reduce the burn time, as well as to spread and tend to dissipate the electrical discharge that would exist near the spark plugs as a result of the interaction of the microwave electric field with the initial spark plasma discharge. The section of the piston top 14 beyond the rim 22 could also be flat or even concave (to produce a clam-shell design), reducing surface to volume ratio, as long as a stable microwave mode can be maintained near TDC.

Figure 1A:
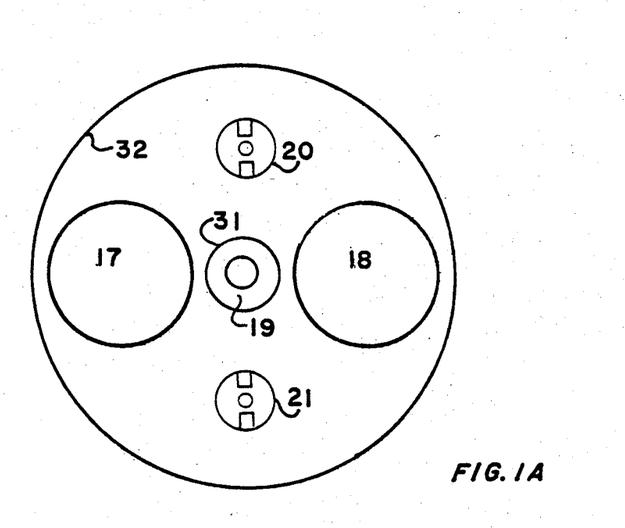
FIG. 1A is a cross-sectional top view of the cylinder head, showing valves, spark plugs and microwave coupler.

Two spark plugs 20 and 21 are used for the following reasons: to reduce the burn path (and hence burn time), and to present symmetrical ignition electrical discharges to the microwaves, to reduce microwave reflection (which is also reduced through squish discharge dissipating effects). The plugs are used to produce a higher current discharge such as is found in plasma jet ignition (See Ward and Wu, U.S. Pat. No. 4,317,068).

A heat insulating layer (possibly ceramic) 24 is placed at the topmost part of the cylinder sleeve (and can be placed elsewhere) to reduce the radial heat conductivity (heat transfer) of this region and enhance its fast warm-up. The insulating layer 24 can also serve as a microwave choke by introducing a horizontal channel 30 shown in the figure as long microwave excitation is limited to less than 30° either side of TDC (in Ward, U.S. Pat. No. 4,297,983 the choke is shown placed in the piston). The channel can have small solid metallic sections, where it intersects the interior cylinder wall 25, as a way of helping retain the ceramic in place without destroying choke action. Note that the rings 23 are placed below the level of the choke (about $\frac{1}{2}''$ to $\frac{3}{4}''$ below the cylinder head) so that they do not interfere with choke action. Also, if oil lubrication is used (preferably synthetic), then locating the rings 23 in this way helps keep the oil (film) away from the hotter surfaces 12, 14, 25 and 26. The piston and cylinder surfaces 12 and 14 would be preferably composed of Stainless Steel (SS) or iron-nickel alloy (Fe-Ni), or other such material to handle the higher temperatures. The relatively low thermal conductivity of these materials (SS has a thermal conductivity about a tenth of Aluminum) reduces heat transference to improve the engine's adiabatic properties without having to overly depend on ceramics. These two thermal properties also suggest the construction of the exhaust manifold 28 out of SS (for fast warm-up and higher operating temperature).

From the microwave point of view the use of, for example a SS combustion chamber would be highly desirable because SS also has a very low electrical conductivity (about a twentieth of Aluminum). This has two positive consequences. First it implies that the empty combustion chamber would have a relatively low Q (electrical Quality Factor) of about 300 to 600, improving the ability to effectively couple microwaves to the combustion chamber throughout the entire combustion process (including prior to combustion if so desired). Secondly, the low electrical conductivity means that a layer of thickness equal to several skin depths (about 0.001" [one mil]) would be heated by the microwaves, further stimulating the combustion by reducing the wall quenching effects. This factor could be enhanced by constructing a piston and/or cylinder with about 0.001" SS on a ceramic backing (by flame-spraying techniques, for example) so that a more intense heating (higher temperature) of the surface layer can be achieved (through reduced heat transference from it) to reduce wall quenching effects.

Most of the engine would be surrounded by heat retaining and controlling shields 34 for the purpose of achieving some temperature control of the surrounding air, by means of small electric fans. In this way temperature sensitive areas (where electronics for example, are contained) can be kept at close to under-hood ambient temperatures, and other areas allowed to achieve highest practical temperatures for more optimal adiabatic engine operation.

FIG. 1A depicts the inside cross-sectional view of the cylinder head of FIG. 1. The microwave probe coupler 19 is in the center, and the spark (or plasma jet) plugs 20, 21 are located approximately half-way between the edge 31 of the probe coupler 19 and the cylinder wall 32 (the upper edge of 25, FIG. 1). The valves 17 and 18 are located between the coupler 19 and the cylinder wall 32. The orientation of the intake valve 17 is different from that of the exhaust valve 18 because of the requirement to achieve "controlled intake valve closure" (CIVC) as a way of controlling engine air-throttling with minimum pumping losses. This is discussed fully with reference to FIG. 3. The need and advantages of CIVC will become apparent in the following discussion of the P-V diagrams of FIG. 2.

Figure 2:
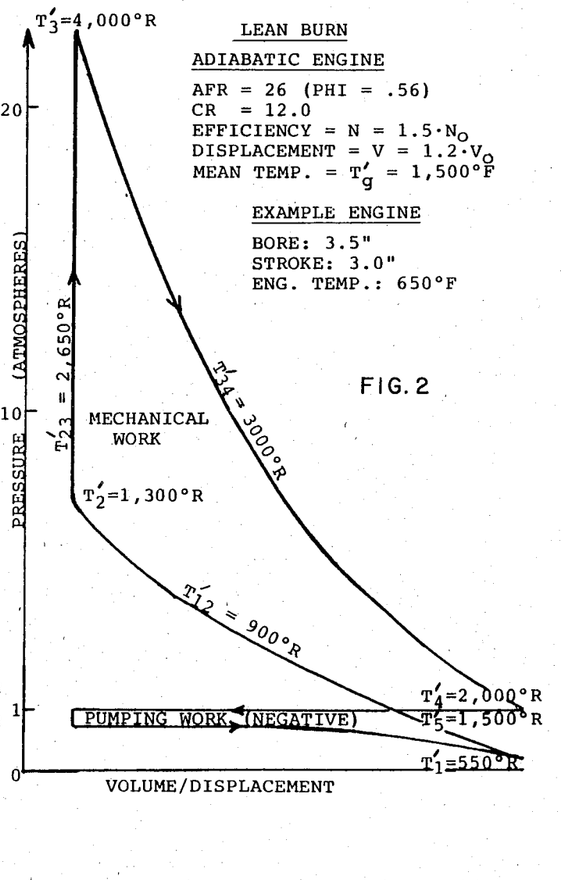
FIG. 2 depicts ideal operating P-V cycles (Pressure-Volume diagrams) for conventional engines and for the present improved engine invention.

FIG. 2 depicts idealized P-V diagrams for a conventional engine and for the present improved engine invention. The "Conventional standard" engine is assumed to operate at stoichiometric air-fuel ratio ( of 14.7 to 1 or $\Phi=1$) and at a compression ratio of 8 to 1 (limited by engine knock and NOx emissions) with no exhaust gas recirculation (EGR). The improved engine operates at around 26 to 1 air-fuel ratio ($\Phi=0.6$) and at a compression (expansion)ratio of 12 to 1.

In comparing these P-V curves, the following approximations (for lean mixtures) should be appreciated and kept in mind:

Flame speed $S_u \simeq S_{uo} \cdot [T^u]^{2.5}/[P^u]^{0.25}$ where $T^u$, $P^u$ are the unburnt gas temperature and pressure respectively, and $S_{uo}$ is the ambient temperature and pressure flame speed.

With regard to microwave enchancement of combustion, the following very approximate relationship can be made (for Propane):

$S_{uo} \simeq [\Phi - 0.53]$ meters/sec.

$S_{uo}^{mw} \simeq [\Phi - 0.43]$ meters/sec.

where $\Phi$ = Equivalence ratio = [Stoichiometric air-fuel ratio]/[Actual air-fuel ratio].

and $S_{uo}^{mw}$ is the microwave enhanced flame speed. The effect of the microwaves is being modeled as reducing the lean flammability from 0.53 to 0.43, and increasing the flame speed by progressively larger amounts as the normal lean limit is approached. The above relationships hold for $\Phi \leq 1$. Curves demonstrating these results are given in Ward, *Journal of Microwave Power*, (3), 1980.

An immediate conclusion that can be drawn is that in operating near an air-fuel ratio of 26 to 1 ($\Phi=0.6$), we are operating in a range where the unstimulated flame burns very slowly if at all. Preignition with such a mixture is practically impossible, making adiabatic operation now possible. Moreover, to obtain proper flame propagation, one must stimulate the flame both electrically (with microwaves) and thermally. (Thermal stimulation is achieved by providing maximum precombustion unburnt gas temperatures through heat transference from elevated operating temperature engine surfaces and through greater adiabatic heating through higher compression ratio operation, and through unconventional valve timing. These thermal considerations are contrary to the conventional wisdom on proper engine operation.

FIG. 2 shows real gas, ideal operating cycles for the "conventional standard" and improved engine, with the differences between the two engine operating modes described in terms of these curves. The curves also aid in the description of the two engines under non-ideal cycle operating conditions, expecially in describing the effects of the highly unconventional valve timing used in the improved engine. The temperatures shown (in general are accurate to better than 10% and) are used primarily for bringing out the differences between the two engines.

Beginning with the cycle starting point 1, we note that $T_1 > T_1'$. The difference is due primarily to the different exhaust gas residual for the two different compression ratios, and because of the expansion cooling of the improved engine's CIVC operation under part load. Precombustion temperatures reverse ($T_2 < T_2'$) because of the greater adiabatic heating (temperature rise) from the higher compression ratio of the improved engine.

The peak (post combustion) temperatures $T_3$, $T_3'$ differ considerably; the improved engine has a peak operating temperature $T_3'$ of approximately 1,000° F. lower than $T_3$ (°F.=°R−460), eliminating NOx emissions for practical purposes in its case, and reducing its peak pressure so that it is comparable to the conventional engine (despite the substantially higher compression ratio of the improved engine). The average expansion temperature $T_{34}'$ (average of $T_3'$ and $T_4'$) is seen to be 1,250° F. less (than $T_{34}$) for the improved engine (because of the substantially higher air-fuel ratios and expansion ratios), leading to the substantially reduced heat losses and hence to the efficiency increase summarized in Table 1. Similarly, the exhaust temperatures $T_4'$, $T_5'$ are substantially lower for the improved engine, which helps in part to compensate for the higher engine (block or cylinder) temperature in controlling underhood temperatures. $T_5^{(\prime)}$ sensitive to load (unlike the other temperatures) and is shown here for an average load setting. The lower the load setting, the lower $T_5^{(\prime)}$ is, because of the greater degree of expansion cooling that occurs upon opening of the exhaust valve (represented by the process 4-5). The most important and striking difference between the two engines is their mean temperatures $T_g$, $T_g'$. Mean combustion temperatures are defined in several ways, and the following definition has been chosen for the present purposes:

$$T_g^{(\prime)} \equiv [T_1^{(\prime)} + T_{12}^{(\prime)} + T_{34}^{(\prime)} + T_5^{(\prime)}]/4$$

One important characterization of the improved engine (the CEI Lean Burn Adiabatic Engine) is that it has an ideal cycle mean gas temperature $T_g'$ approximately three quarters that of the "conventional standard" engine, i.e. $T_g' \simeq \frac{3}{4} T_g$. We can place bounds on the definition of "approximately three quarters" according to the following:

$$\tfrac{3}{5} \leq T_g'/T_g \leq 4/5.$$

Another important difference is that in the improved engine the exhaust pressure $P_4'$ is close to atmospheric at low to moderate loads, because of the very lean mixture and moderately high expansion ratio. At the 0.25 load setting shown, $P_4'$ is almost exactly one atmosphere (representing a complete expansion cycle, which is the most efficient cycle). In the conventional engine, exhaust pressure is much higher, representing significant energy loss (and hence efficiency reduction).

Other differences between the improved and standard engine are those relating to non-ideal cycle factors, principally:
1. Slow burning
2. Heat losses
3. Valve timing.

These are discussed with the objective of bringing out the additional differences between the two engines.

1. Slow burning. Slow (delayed) burning is a more serious problem with the improved engine because of the much leaner, ordinarily slower burning mixture, which would reduce efficiency and aggravate engine knock. To overcome this problem, (1) two spark plugs and (2) microwave stimulation are used (which reduces burn time). Thermal stimulation is also used for the same reasons. This is achieved through use of (3) higher compression ratio (raising $T_2'$), (4) through reduced heat losses because of the much hotter engine (which tends to maintain $T_{23}'$ close to its theoretical value) and (5) through unconventional valve timing (See 3.). In this way delayed burning is minimized, while NOx emissions are kept at a minimum and efficiency is maintained at a high value.

2. Heat losses. Heat losses lower $T_2'$, $T_3'$, $T_4'$, which is undesirable for the improved engine (as their values are already low). To prevent this to any substantial extent, the engine temperature must be maintained as high as possible, by elimination of forced cooling and by reducing heat transference from the cylinder to the outside. Combustion temperatures are lowered through convective heat transference to the cylinder walls, which is proportional approximately to the gas-engine temperature difference (and the degree of turbulence or swirl). Use of synthetic oil or even elimination of crankcase oil, will allow for higher engine operating temperatures. The benefits of reduced heat transference (other than efficiency and emissions improvements), are improved burn rate leading to greater knock resistance (since $T_g'$ is already low, minimizing the temperature of knock aggravating hot spots). In the improved engine $T_2'$ could in fact be increased through reverse heat flow (during the compression stroke 1-2) because of the much hotter engine, leading to greater thermal stimulation of the burn, especially at the early stages of combustion.

3. Valve timing. In conventional engines, the exhaust valve opens at about 45° before bottom dead center (BDC) and the intake valve closes at about 45° after BDC. In the improved engine exhaust valve opening (EVO) occurs 45° to 90° later (from about BDC to 45° after BDC), and intake valve closure (IVC) occurs about 45° earlier (around BDC) under full load conditions with CIVC operation (See discussion under FIG. 3). Conventional engine design emphasizes high volumetric efficiency (at high RPM) as a way of achieving peak power (with the smallest displacement engine) and is thus constrained to the described valve timing. It is a characteristic of the improved engine to deemphasize volumetric efficiency at high RPM and the supposed advantages of small displacement, and to concentrate on full utilization of expansion power, and both reducee maximum peak pressure (and hence reduced knock) and reduced (low load and high RPM) pumping losses, through the CIVC. The improved engine, among several other things, offers higher low load efficiency, higher low end torque, and high peak power through a potentially larger displacement but lighter engine.

Figure 3:
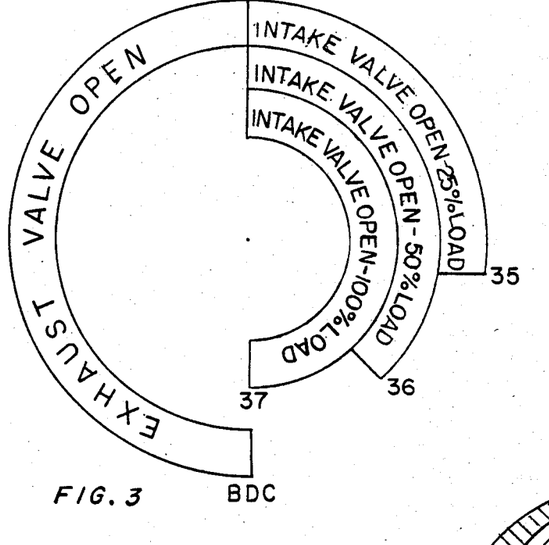
FIG. 3 is a circle diagram depicting preferred valve operation.

The improved engine intake valve operation is described in the next section with reference to FIG. 3, and is not repeated here. The improved engine exhaust valve operation is characterized by the above mentioned late opening to give maximum efficiency and minimum exhaust temperatures (within the context of maximum heat conversion to work and minimal heat losses). In a very hot engine (preferably in the oiless version of the improved engine) late opening is further advantageous, by providing longer exposure of the burnt gases to the hot cylinder walls, to further promote oxidation of unburnt hydrocarbons. Furthermore, at low loads, exhaust pressure $P_5'$ will be at a relatively low value of around one atmosphere (See FIG. 2), making it practical (efficient) to further delay EVO (to say up to 45° after BDC) to further promote oxidation of combustion products. Exhaust valve closure (EVC) in the improved engine is made to occur anywhere between TDC and about 45° after TDC (and must be related to intake valve opening (IVO)) to both increase intake charge temperature $T_1'$ (especially when the engine is cold) and to reduce CIVC expansion gas losses (through delayed IVC) at part load. EVO and EVC can be also made variable, as in CIVC, or more simply through rotation of the exhaust cam, which keeps opening-to-closing angle a constant. For example, the exhaust cam could be rotated counter to the engine rotation with load and/or temperature to provide for example, 30° after TDC EVC and 40° after BDC EVO at very light load (and/or low temperature) and decreasing angles with load (to say 10° and 20° respectively at full load). With proper design of exhaust valve closure, the exhaust pressure can be maintained close to atmospheric pressure under a moderate (typical driving) load range at low loads (say from 0.15 to 0.30 of full load).

An analysis of the efficiency gains brought about by the improvements of the lean burn adiabatic engine invention as per FIG. 2 and from the above consideration, is given in the table below. The principal advantages come from the higher compression and expansion ratios, from the improved thermodynamic properties of the extremely lean mixture, from the lower combustion and higher engine operating temperatures, and from the CIVC. The three principal advantages are detailed at the end of Table 1.

TABLE I

|  | CONVENTIONAL ENGINE (COMP. RATIO = 8.0; AFR = 14.6; Φ = 1.0; Effective k = 1.27) | | LEAN BURN ADIABATIC ENGINE (COMP. RATIO = 12.0 AFR = 26.0; Φ = .56 Effective k = 1.30) | | PERCENT IMPROVEMENT | |
|---|---|---|---|---|---|---|
|  |  |  |  |  | INCREM. | CUM. |
| FUEL AVAILABLE WORK. | 1.0 | 100% | 1.0 | 100% | — | — |
| FUEL ENERGY LOWER HEAT OF COMBUSTION. | .96 | 96% | .98 | 98% | 2% | 2% |
| IDEAL GAS AIR-CYCLE | .56 | 54% | .63 | 62% | 13% | 15% |

TABLE I-continued

| | CONVENTIONAL ENGINE (COMP. RATIO = 8.0; AFR = 14.6; Φ = 1.0; Effective k = 1.27) | | LEAN BURN ADIABATIC ENGINE (COMP. RATIO = 12.0 AFR = 26.0; Φ = .56 Effective k = 1.30) | | PERCENT IMPROVEMENT | |
|---|---|---|---|---|---|---|
| | | | | | INCREM. | CUM. |
| OTTO ENGINE. REAL FUEL-AIR OTTO-CYCLE | .76 | 41% | .84 | 52% | 11% | 26% |
| BURNING AND CYLINDER WALL LOSSES. | .80 | 33% | .88 | 46% | 10% | 39% |
| FRICTIONAL LOSSES (PUMPING & MECHAN.) | .80 | 26% | .85 | 39% | 6% | 50% |
| PARTIAL LOAD FACTOR (ESTIMATE: .75) | .75 | 20% | .75 | 30% | 0% | 50% |

This 50% projected improvement occurs at less than 50% load. At higher loads the improvement is smaller. The factors that give rise to the three principal efficiency improvements are given below:
1. Ideal gas air-cycle otto engine (13% improvement): Brought about by higher compression ratio made possible by faster burning of leaner mixtures and controlled intake valve closure.
2. Real fuel-air Otto-cycle (11% improvement): Brought about by burning a leaner mixture with its higher specific heat ratio k.
3. Burning and cylinder wall losses (10% improvement): Brought about by burning a much leaner mixture (of much lower flame temperature) in a hotter engine (having T) in a low swirl environment.

The Table shows that exclusive of frictional losses, the improved engine gives a 40% gain in efficiency. This would translate to requiring a 20% larger engine for the same peak power assuming the 26 to 1 air-fuel ratio is maintained, i.e. the improved engine displacement would be:

$$V = V_o/([\Phi/\Phi_o] \cdot [\eta/\eta_o])$$

$$= V_o/([.6] \cdot [1.4]) = 1.2 \, V_o$$

where $\eta$ designates efficiency, and the subscript "o" designates the conventional engine. But a 20% larger engine would have higher frictional losses and greater weight, which when combined with a possibly lower volumetric efficiency, would lead to a requirement for a 25% to 30% larger engine.

It is for such reasons (which are universally given for dismissing the very lean burn engine) that substantial reduction of (low load) pumping losses through the CIVC is important (pumping losses constitute the major frictional loss at low loads). For the same reasons it is important to reduce weight and parasitic power losses through elimination of the water cooling system. These factors work to now further increase the efficiency gain from 40% to about 50% or higher, and require only at most a 20% larger displacement engine.

It is possible that the engine may not have to be larger at all by relaxing the criteria of optimal emissions and efficiency under accelerating and high load conditions. High load is defined here as greater than 50% of peak load, and accelerating conditions are defined as when the gas pedal position is changed by being depressed to speed up the engine (vehicle). If the emission test cycle can be satisfied by allowing for richer mixtures (say 20 to 1 or lower air-fuel ratio for gasoline) under the more limited "high load/acceleration" conditions (as defined above), the, when taken with the other improvements of the engine, the engine may not have to be larger.

The effect of CIVC is shown in reference to curves defined by 5, 6, 7, 8(1), 1' of FIG. 2. By throttling the engine through valve closure before (BDC), the intake manifold is maintained close to atmospheric pressure and pumping losses are substantially reduced (at low loads) as indicated.

To summarize, the elimination of the cooling system (producing a lighter and hotter engine with lower parasitic power losses) and use of the CIVC and unconventional valve timing, work in a synergistic way, to take advantage of the improved engine's operating cycle indicated in FIG. 2, and to give very high efficiency and low emissions in a simple and low cost engine system.

Figure 3A:
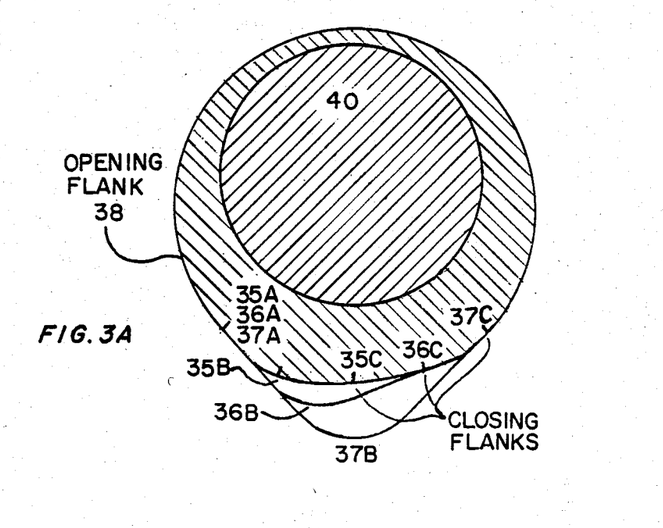
FIG. 3A is an end view depicting three cross-sectional slices of the tapered cam used for controlling intake valve closure.
Figure 3B:
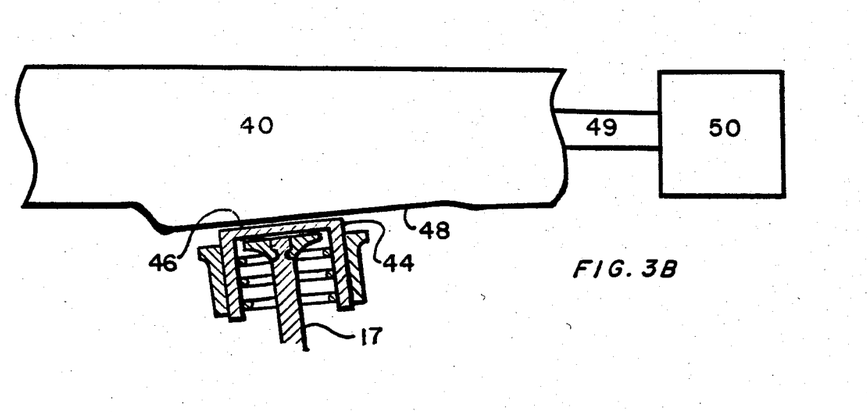
FIG. 3B is a side view of the CIVC showing one section (for one cylinder) of the cam and the upper part of the valve mechanism.

FIGS. 3, 3A, and 3B are drawings relating to the operation of the CIVC for a four cylinder (or less) engine, which is the most practical size of the improved engine for general automotive applications. In FIG. 3 the exhaust valve is shown to open at BDC (for maximum efficiency and lowest exhaust temperatures), although as discussed it can be opened even later, and the intake valve is shown kept open for a maximum of 180° (for proper CIVC designed operation).

These are two constraints on the preferred system, and for example the exhaust valve may be opened later than BDC (but not before, except under acceleration/high load conditions) and closed later than TDC, and the entire intake valve operation may be rotated (say clockwise by 15°), preserving exhaust valve opening and maximum 180° intake valve opening (or 240° for a three cylinder, four stroke engine, and so on). The CIVC operates through use of an independently operated and controlled tapered intake valve cam 40, which is free to slide longitudinally (under electromechanical or purely mechanical forces) to keep the intake valve 17 open to varying degrees depending where on the taper 42 the cam follower 44 is located. Intake valve 17 closure variation is achieved through sliding of the cam 40 during the "free period" that exists during each revolution of the four (or less) cylinder, four stroke improved engine. The "free period" is that period of time in each revolution when the cam 40 is not pressing any of the cam followers (which must exist since we have limited intake valve opening to 180°). During this "free period" no rubbing of the cam against the cam follower 44 occurs, so that easy sliding can occur. The requirement of the free period is preferred, although not absolutely essential. For example for greater than four cylinder engines one could not have it (without unduly limiting intake valve closure), although one could still create a "free period" by having more than one intake valve tapered cam.

With reference to FIGS. 3, we show three arbitrary closures of the intake valve 17, which are designated as points 35, 36, 37. FIG. 3A depicts three cross-sectional profiles of the cam corresponding to the circle diagram in FIG. 3. The points 35B, 36B, 37B are the "nose cam" points of the particular sections. The closure points are shown as 35C, 36C, 37C. Note that the normal (closed throttle or off) position of the cam is with the cam follower 44 all the way on the right of the cam 40 shown in FIG. 3B, giving minimum intake valve opening duration. This has the important advantage (over conventional throttling) in that under cranking conditions, the cylinder pressure is at its lowest level in this case (at the lowest load position), making for easy cranking, especially under severe conditions, such as very cold days when battery voltage is low. CIVC thus also makes more electrical power available during cranking to drive the ignition and flame stimulation electrical power supplies, eliminating the need for a larger battery and simplifying ignition system design. In conventional throttling, cranking speeds are too low to allow the throttle plate to be effective (because of the very low air-flow velocities), so that cranking occurs against almost peak pressure (equal to wide open throttle).

With reference to FIG. 3A, it is noted that the cam is tapered to give constant valve opening; it clearly could be tapered to give non-constant opening. For example, a slight taper can be placed on the opening flank 38 so that the valve opening advances with load requirement, from say 30° after TDC at light load to 10° after TDC at full load. Furthermore, IVO variation can be synchronized with EVC for optimal operation. IVO can also be retarded with load, if required, by for example, rotating the cam (with respect to the crank) in synchronization with EVC.

FIG. 3B is a 90° rotation of FIG. 1 about a vertical axis. It is noted that the face 46 of the cam follower 44 is parallel to the taper face 42, while the exhaust valve is vertical. This is required to eliminate undue wear between these two surfaces 46 and 42, and creates the added complication of slightly unsymmetric intake 17 and exhaust 18 valves with respect to the cylinder axis. For a single cylinder engine the symmetry can be preserved and the intake valve cam 40 itself angled to make 42 parallel to 44, which would now be horizontal.

The cam 40 is actuated (moved axially) by means of the cam actuator 43. In its simplest form, 43 is a mechanical linkage mechanism connected to the vehicle gas pedal; in more advanced form, it is an electromechanical actuator, which is described more fully with reference to FIG. 4. The cam actuator 43 slides cam 40 by means of shaft 41 (through a bearing mechanism as the cam is rotating), to adjust the mass of air/fuel mixture entering the cylinder. As shown in FIG. 3B, motion from right to left (pushing of the cam 40 by shaft 41) represents motion producing earlier valve closing (lighter load). In this mode, the cam 40 could be operated by having it spring loaded at the left-most end with a spring under compression, with appropriate spring constant to be able to move the cam if no obstruction is placed at the right. The shift 41 and linkage mechanism then controls the axial motion by acting as a stop, with the fully extended (left-most position) of the shaft being the light load position, and higher loads being obtained by pulling on shaft 41. By reversing the taper (and valve orientation), higher loads are achieved by pushing on shaft 41. In this case, one can spring load the cam (through a roller bearing) with a spring not sufficient to move the cam, but sufficiently so that with light pressure from shaft 41, the cam 40 will slide. Other combinations of the type described are clearly also possible.

For use in an automobile or other application in which safety may be an issue, the taper and spring loading should always be arranged so that a failure of the shaft 41 or the controller results in reducing the power output of the engine i.e. using the opposite taper to the one shown in FIG. 3B.

Figure 4:
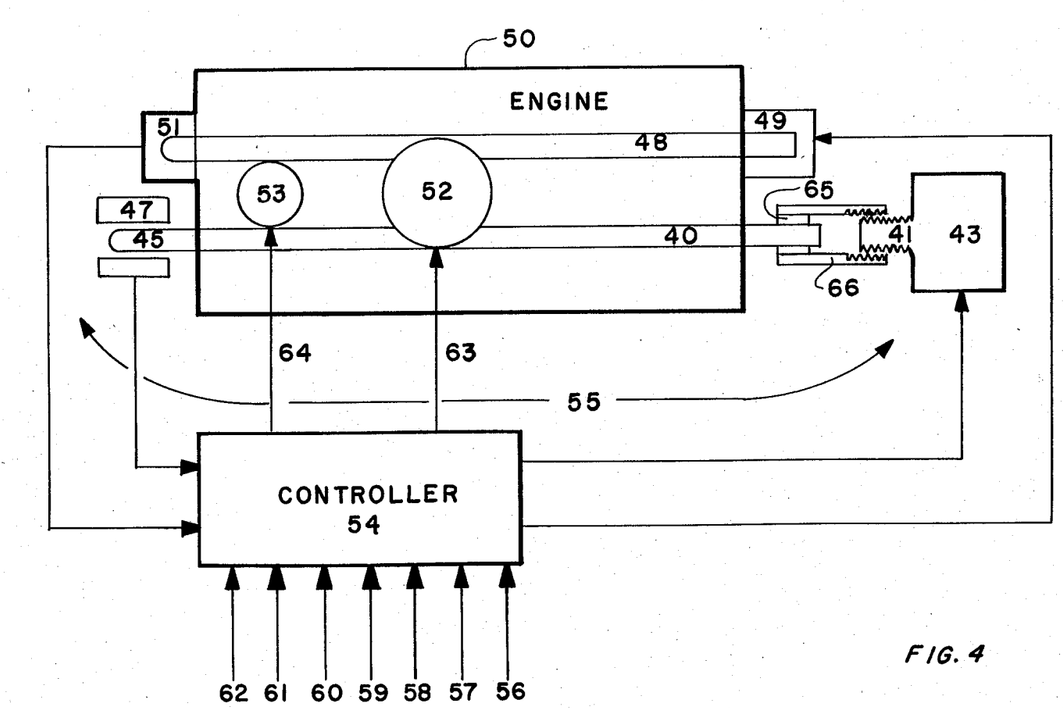
FIG. 4 is a schematic of an advanced (feedback loop) cam actuator and engine controller.

FIG. 4 is a schematic of a more advanced (feedback loop) cam actuator (and other controller) circuit 55. Fifty (50) is a schematic representation of the engine with carburettor 52 and ignition and flame stimulation system 53. Forty (40) and 48 are the intake valve cam and exhaust valve cam respectively. The three main elements making up the feedback loop circuit are the controller 54, the actuators 43/49 and the position/rotation sensors 47/51. The controller 54 performs signal comparison to a system transfer function, or performs a calculation to a system transfer function from the input sensor data.

In its simplest form, the circuit 55 uses a mechanical (independent variable) cam actuator as described with reference to FIG. 3B, and does not use sensors 47/51 for feedback control. The controller 54 receives input signals which sense the gas pedal position, 56 (the principal controlling variable), engine speed (RPM) 57, engine temperature 58, intake-air temperature 59, intake manifold vacuum 60, knock-detection 61, and possibly others. It processes these by means of a predetermined transfer function programmed in the controller 54 and provides outputs to vary air-fuel mixture (output 63), spark timing and electromagnetic stimulator (output 64) exhaust valve opening and closure variation (output 65), and possibly others. It can sample these input variables at a rate of, for example, one per milisecond.

In this form, the system is subject to errors due to mechanical machining tolerances, assembly and mechanical wear of parts. These can be eliminated through feedback from position and/or other sensors, such as the linear differential transformer sensor 47 connected to the output shaft 45 of the intake valve cam 40. The sensor 47 is especially suitable since it does not require physical contact with what may be a hot cam shaft 40. It is simply a special transformer connected to a phase comparator circuit, which gives a phase angle output for example, (between two square waves) as a function of cam 45 position (penetration into the winding (47)). This information is fed back into controller 54, which then, by means of comparator circuits, can insure that the cam is positioned as required. Other feedback sensors, such as exhaust cam rotational sensor 51 can be used, to feedback-control (through actuator 49) the exhaust cam, and other engine variables.

The most advanced (electronic) system is one whereby the actuator 43 and shaft 41 are electromechanical. In particular, 43 represents a stepping motor connected to the shaft 41, by means of, for example, a bearing 65 and wormgear 66, to provide motion to the cam. A shock absorbing part (which is possibly also thermally insulating) may have to be interposed between motor 43 and shaft 41 to handle the non-continuity of the cam "free period" (if it exists) and its possible high temperature. The advantages of the controller 54 and stepping motor 43 combination is that it allows for other than simple linear relationships between gas pedal position and cam axial position, as well as eliminating the requirement for possibly very large pedal pressure to actuate the cam and/or spring assists (as described in reference to FIG. 3B.)

It is within the context of the invention that the intake and exhaust valves can be controlled independently or in synchronization, and that either linear tapered cam means or can rotation means (relative to the engine crank) be used in any combination or permutation to achieve optimal engine operation with respect to efficiency, emissions, power, cost and simplicity. Other direct means, such as electromechanical or hydraulic means to control valve timing, are also within the context of the invention.

In addition most of the principles described herein with regard to ultra lean, elevated temperature, high expansion ratio operation can be applied to a two stroke IC engine, where emissions would be emphasized to a greater extent (the two stroke engine's principal problem) since power to weight ratio of a two stroke is already high.

Since certain changes may be made in the above apparatus and method without departing from the scope of the invention herein involved, it is intended that all matter contained in the above description, or shown in the accompanying drawings shall be interpreted in an illustrative and not in a limiting sense.

What is claimed is:

1. Internal combustion engine apparatus comprising:
   (a) means defining at least one compression/expansion chamber,
   (b) a movable compression/expansion element moveable within such chamber,
   said parts (a) and (b) being constructed and arranged to provide cyclic compression and expansion of a combustion space within such chamber through regular cyclic movement of such members,
   (c) means for providing a very lean air and fuel mixture with an average precombustion equivalence ratio $\Phi$ of less than 0.75 in all but high load/acceleration conditions
   (d) means for admitting air and fuel to such space,
   (e) electrical means for igniting, combined with means for stimulating combustion of, said very lean mixture, such that on the average the real fuel ideal otto cycle mean gas ranking temperature $T_g$ for this engine is within two thirds and four fifths that of the "conventional standard" engine ($T_g \approx \frac{3}{4} T_g$),
   (f) means for exhausting combustion gas from such chamber space,
   (g) means for extracting work from the expansion driven movement of said moveable member and returning work for compression movement thereof, and
   (h) means for limiting cooling of the chamber walls adjacent to the combustion space,
   the apparatus as a whole being constructed and arranged to enable essentially adiabatic operation of the engine.

2. Internal combustion engine apparatus in accordance with claim 1 wherein the said means for air and fuel admission (d) are constructed and arranged to control the amount of admitted constituents in relation to the load requirements and to minimize the engine air frictional pumping losses, said admission means comprising a controller responsive to engine load requirements, to set the required amount of air/fuel mixture admission.

3. Internal combustion engine apparatus in accordance with claim 2, wherein the air/fuel admission means comprise a linearly tapered cam operating a spring loaded linear movement intake valve, with the cam being a barrel type, with valve opening and closure defined by cam rotation, the cam being linearly moveable to present different cam profiles for valve closure control in response to engine load requirements, and means for effecting such linear cam movement, as a function of engine load.

4. Internal combustion engine apparatus in accordance with claim 3, wherein intake valve opening is limited to a maximum of less than 720°/n, where n is the number of engine cylinders of a four stroke engine (180° for a four cylinder, four stroke engine—the typical engine), such condition defining a free period during which there is no loading of the valves by the cam/spring combination, said free period defining the time during which linear axial movement of the tapered cam is effected for changing load settings.

5. Internal combustion engine apparatus in accordance with claim 4, wherein axial movement of the tapered cam is produced through mechanical linkage to the vehicle gas pedal, such axial movement also being coupled to air/fuel mixing means, ignition and flame stimulating means, and exhaust valve control means, to vary these in a predetermined and prescribed way with axial movement of the cam.

6. Internal combustion engine apparatus in accordance with claim 1, wherein the means for stimulating combustion comprise a microwave source coupled to the combustion space and flame therein and controlable to accelerate flame propagation.

7. Internal combustion engine apparatus in accordance with claim 6, wherein the empty chamber has a Q of less than 600 and the walls have preferably electrical resistivity of greater than 25 microhm-cm and thermal conductivity less than 0.2Kcal/sec m °C.

8. Internal combustion engine apparatus in accordance with claim 6, wherein igniting and stimulating means comprise at least two spark plugs disposed about a centrally located microwave probe coupling means, to insure both symmetrical electrical loading to the microwave coupler and reduced possibility of early microwave breakdown to form unduly large electrical discharge.

9. Internal combustion engine apparatus in accordance with claim 5, wherein the engine is constructed and arranged to operate at a compression (expansion) ratio in excess of 10 to 1.

10. Internal combustion engine apparatus in accordance with claim 1 wherein the engine is constructed and arranged to operate at a compression (expansion) ratio in excess of 10 to 1.

11. In an internal combustion engine apparatus comprising means defining a multi-cylinder engine housing with pistons movable in cylinders and connected to a work-extracting drive system arranged for extracting work from the pistons in cyclic alteration on expansion strokes thereof; and returning work to the pistons to drive them, in cyclic alternation, in compression strokes, to define a cyclically expanding and compressing combustion space at a combustion zone of each cylinder, air/fuel inlet and outlet means in each such zone, and means for initiating and maintaining combustion in each such zone, the improvement comprising the provision in each cylinder/piston combination, in combination with the foregoing, of:
   (a) means for controlling the air/fuel mixture to a lean condition of equivalence ratio $\Phi$ of less than 0.75 except under high load/acceleration conditions,
   (b) means for reducing the burn time of said mixture by a factor of at least two compared to the burn time of that mixture with conventional single point spark ignition and no microwave stimulation in a similar chamber with liquid cooling, (c) means for retaining heat left in the combustion zone after expansion and imparting such heat from a previous expansion to air/fuel mixture admitted in a next compression step, to preheat mixture in such compression step to aid in the reduction of burn time, except under high load/acceleration conditions.

12. Apparatus as recited in claim 11 wherein the air/fuel inlet means for each cylinder comprise intake manifold means and mixture inlet valve means constructed and arranged to effect a pressure in the inlet manifold near atmospheric and no lower than 50 cms Hg absolute pressure in order to reduce engine air pumping losses.

13. Apparatus as recited in claim 11 wherein said means for retaining and imparting heat (effectively transferring heat) comprise combustion chamber surfaces made of at least one thin metallic layer of thickness between 0.001" and 0.050", backed by heat insulating means.

14. Apparatus as recited in claim 11 constructed and arranged to operate at a compression (expansion) ratio in excess of 10 to 1.

15. Apparatus as recited in claim 11 comprising spread multiple ignition elements for each cylinder's combustion zone and a microwave coupling element integrated with the cylinder head construction, the cylinder head being contoured in such portion to provide space for such elements together with inlet and exhaust valves, and the piston head being contoured to interact and not interfere with the head and said elements.

16. Apparatus as recited in claim 15 wherein cylinder head is section of cone with 15° to 30° cone angle with respect to horizontal, and piston head is contoured to have lobed rim and central portion is contoured to produce minimal shift in microwave frequency with piston motion for 30° either side of top dead center.

17. Apparatus as recited in claim 11 wherein compression ratio is between 12 and 16 to 1, wherein exhaust valve opening is made variable through exhaust cam rotation relative to engine rotation and occurs between 10° and 40° after BDC, and exhaust valve closure varies a corresponding 30°, and wherein fresh (inlet) air/fuel ratio is varied approximately in proportion to load (for a warmed-up engine) such that exhaust pressure at BDC is kept as close to one atmosphere as possible, excepting under high load/accelerating conditions.

18. A method for operation of an internal combustion power system of the type utilizing a multi-cylinder engine housing with pistons movable in cylinders and connected to a work-extracting drive system arranged for extracting work from the pistons in cyclic alteration on expansion strokes thereof, caused by combustion of an air/fuel mixture; and returning work to the pistons to drive them in, cyclic alternation, in compression strokes comprising the steps of:
(a) controlling the air/fuel mixture to a lean condition of equivalence ratio $\Phi$ of less than 0.75 except under engine high load/acceleration,
(b) limiting the burn time of said mixture by a factor of at least two compared to the burn time of that mixture with conventional single point spark ignition and no microwave stimulation in a similar chamber with liquid cooling,
(c) retaining heat left in the combustion zone after expansion and imparting such heat from a previous expansion to air/fuel mixture admitted in a next compression step, to preheat mixture in such compression step to aid in the reduction of the burn time, except under high load/acceleration conditions.

19. Method as recited in claim 18 and further comprising controlling pressure in the inlet manifold near atmospheric and no lower than about 30% vacuum, in order to reduce engine air pumping losses.

20. Method as recited in claim 18 constructed and further comprising control thereof to operate at a compression (expansion) ratio in excess of 10 to 1.

21. Internal combustion engine apparatus comprising:
(a) means defining at least one compression/expansion chamber,
(b) a movable compression/expansion element moveable within such chamber, providing compression/expansion ratio between 10 and 15 to 1, said parts (a) and (b) being constructed and arranged to provide cyclic compression and expansion of a combustion space within such chamber through regular cyclic movement of such members,
(c) means for premixing a very lean air and fuel mixture with an average precombustion equivalence ratio $\Phi$ of less than 0.65 in all but high load/acceleration conditions, (d) means for admitting such premixed air and fuel mixture to such space,
(e) electrical means for igniting, combined with means for stimulating combustion of, said very lean mixture, (f) means for exhausting combustion gas from such chamber space,
(g) means for extracting work from the expansion driven movement of said moveable member and returning work for compression movement thereof, and
(h) means for limiting cooling of the chamber walls adjacent to the combustion space,
the apparatus as a whole being constructed and arranged to enable essentially adiabatic operation of the engine.

22. Internal combustion engine apparatus in accordance with claim 21 wherein the said means for air and fuel admission (d) are constructed and arranged to control the amount of admitted constituents in relation to the load requirements and to minimize the engine air frictional pumping losses, said admission means comprising a controller responsive to engine load requirements, to set the required amount of air/fuel mixture admission.

23. Internal combustion engine apparatus in accordance with claim 22, wherein the air/fuel admission means comprise a linearly tapered cam operating a spring loaded linear movement intake valve, with the cam being a barrel type, with valve opening and closure defined by cam rotation, the cam being linearly moveable to present different cam profiles for valve closure control in response to engine load requirements, and means for effecting such linear cam movement, as a function of engine load.

24. Internal combustion engine apparatus in accordance with claim 23, wherein intake valve opening is limited to a maximum of less than 720°/n, where n is the number of engine cylinders of a four stroke engine (180° for a four cylinder, four stroke engine—the typical engine), such condition defining a free period during which there is no loading of the valves by the cam/spring combination said free period defining the time during which linear axial movement of the tapered cam is effected for changing load settings.

25. Internal combustion engine apparatus in accordance with claim 24, wherein axial movement of the tapered cam is produced through mechanical linkage to the vehicle gas pedal, the apparatus further comprising air-fuel mixing operational means for adjusting the air-fuel ratio, means for relating such axial movement to said air/fuel mixing operational means, ignition and flame stimulating operational means, and exhaust valve control operational means, to vary these operational means in a predetermined way with axial movement of the cam.

26. Internal combustion engine apparatus in accordance with claim 25, wherein element to vary in a predetermined way said various operational means, comprises a controller which performs a comparison or calculation to a prescribed system transfer function from input sensor data which includes at least one of the following: gas pedal (intake cam) position, engine speed, engine temperature, intake air temperature, intake manifold vacuum, and knock detection, and samples these inputs at a prescribed rate.

27. Internal combustion engine apparatus in accordance with claim 26, wherein intake valve cam position is obtained by means of a linear differential transformer sensor connected to an end of the cam, giving electrical phase angle output which is fed back into said controller (for comparison), and creating a feedback loop which insures that the cam is in the required position, and wherein at least one of the following is also controlled by feedback to said controller by means of sensors: exhaust cam position (relative to engine/crankshaft position), air-fuel ratio, ignition timing and electrical-flame stimulation timing.

28. Internal combustion engine apparatus in accordance with claim 27, and further comprising means for producing such axial movement of the tapered cam by a combination stepping motor/interposed shock absorbing element/gearing and bearing element, such stepping motor receiving its instructions (signal) from said controller.

29. Internal combustion engine apparatus in accordance with claim 21, wherein the means for stimulating combustion comprise a microwave source coupled to the combustion space and flame therein and controlable to accelerate flame propagation.

30. Internal combustion engine apparatus in accordance with claim 29, wherein igniting and stimulating means comprise at least two spark plugs disposed about a centrally located microwave probe coupling means, to insure both symmetrical electrical loading to the microwave coupler and reduced possibility of early microwave breakdown to form unduly large electrical discharge.

31. Internal combustion engine apparatus in accordance with claim 29 wherein premixed admitted air/fuel ratio is varied approximately with load within the range of 20 to 1 for gasoline ($\Phi=0.75$) to 30 to 1 for gasoline ($\Phi=0.5$), for at least all but high load/acceleration conditions.

* * * * *